3,384,631
ISOLATION OF BACITRACIN FROM DILUTE SOLUTIONS THEREOF BY PRECIPITATION AS A COMPLEX WITH A DIVALENT METAL AND AN ORGANIC SULFATE OR SULFONATE
Vladimír Kalina, Stanislav Ulbert, and Artur Mašita, Prague, Czechoslovakia, assignors to Spofa, Sdruzeni podniku pro zdravotnickou vyrobu, Prague, Czechoslovakia
No Drawing. Filed June 23, 1965, Ser. No. 466,444
Claims priority, application Czechoslovakia, June 26, 1964, 3,687/64
11 Claims. (Cl. 260—112.5)

ABSTRACT OF THE DISCLOSURE

The antibiotic bacitracin is recovered from a crude solution therof, in particular from the original culture medium, by adding to the solution
(I) a compound of the general formula R—SO$_3$H, or a soluble salt thereof, R being alkyl, aralkyl or alkaryl and alkyl and aralkyl having from 4 to 20 carbon atoms and alkaryl having at least one alkyl substituent with between 4 and 16 carbon atoms, and R being linked to the —SO$_3$H group either directly or by means of an oxygen bridge; and
(II) a soluble salt of a complex-forming metal.

The reaction is carried out in an acid environment, preferably at a pH between 2 and 5. There is thus formed a complex compound between the sulfonated group, the metal and the bacitracin of the general formula $$(R\text{—}SO_3H)_{4n}(Me)_n(\text{bacitracin})_n$$

wherein R has the meaning just stated and Me is preferably zinc, cobalt, manganese or copper. The complex compound is then separated and the bacitracin is recovered therefrom. Preferably, the recovery is effected by separating the complex compound, dissolving it in an alcohol having from 1 to 5 carbon atoms at a pH between 4 and 9, eliminatnig the complex by an ion exchange reaction and recovering the bacitracin from the reaction product. Good yields of bacitracin are obtained without the necessity of previous concentration of the culture medium.

---

The invention relates to a method of isolation of bacitracin from a crude solution thereof and more particularly from fermented culture liquors, in which bacitracin producing microorganisms have been cultivated.

It is well known that the antibiotic bacitracin is produced by incubation of nutrient media with production organisms, particularly with the strain *Bacillus subtilis* or *Bacillus lichenformis*. The antibiotic is isolated e.g. by extraction with higher alcohols (U.S. Patent No. 2,609,324) or by adsorption on ion-exchange resins (U.S. Patent No. 2,776,240; British Patent No. 837,302). There have been also described precipitation methods utilizing the formation of water-insoluble or little soluble complexes with bacitracin. For example, the complex formation by means of a salt with Polar Yellow 5 G is disclosed in U.S. Patent Nos. 2,556,375 and 2,556,376, while an ammonium molybdate salt is disclosed in U.S. Patent No. 2,763,590. The formation of a complex with methylenedisalicylic acid is disclosed in U.S. Patent No. 2,774,712, and with metals, e.g. zinc, in U.S. Patent No. 2,834,711. The first of these isolation methods is relatively expensive, the adsorption methods on the other hand lead to lower yields. Precipitation methods can be applied only to more concentrated solutions of bacitracin, and therefore require previous concentration of the fermented nutrient medium, which in view of the sensitivity of bacitracin is a delicate operation with a doubtful result.

The above difficulties are obviated by the method according to the invention, by which bacitracin is isolated from crude solutions, particularly from the fermented nutrient medium, in which the bacitracin producing microorganism has been cultivated.

The essence of the method of the invention lies in the fact that bacitracin is converted to an insoluble complex compound of the general Formula I:

$$(R\text{—}SO_3H)_{4n}(Me)_n(\text{bacitracin})_n \qquad I$$

wherein R is alkyl or alkenyl with 4 to 20 carbon atoms, or is alkaryl having at least one alkyl group with 4 to 16 carbon atoms attached to the nucleus, the residue R being linked to the —SO$_3$H group either directly or through an oxygen bridge —O—, and Me being an atom of a complex-forming metal, preferably zinc, cobalt, manganese or copper. The complex is formed by adding to the crude solution (a) a compound of the general Formula II:

$$R\text{—}SO_3H \qquad II$$

wherein R has the same meaning as in the Formula I, or by adding a soluble salt of such compound, preferably a sodium salt, together with (b) a soluble salt of a complex-forming metal, and carrying out the reaction in an acid environment, preferably at a pH of 2 to 5, whereupon the complex compound, after separation from the solution and precipitation, is dissolved in an alkanol having 1 to 5 carbon atoms at a pH from 4 to 9, and is then converted by means of ion-exchangers into bacitracin upon neutralization of the effluent and isolation e.g. by lyophilization.

In the isolation operation one can proceed, for example, in a manner whereby the bacitracin containing compound of the general Formula I is dissolved in an alkanol having 1 to 5 carbon atoms, and is then freed from the anion RSO$_3$— at a pH from 4 to 9 by the action of a strongly basic anion-exchanger in acid form, preferably in the CH$_3$COO$^-$ form, whereupon the solution obtained is concentrated, and the metal complex of bacitracin is concentrated by addition of the soluble salt of the metal that had been used for the elimination of the complex compound of the general Formula I, the metallic complex of bacitracin is precipitated, which is then separated e.g. by centrifuging or by filtration.

As desired, an alternative procedure is possible, in which the alcoholic solution containing the bacitracin, after removal of the anion RSO$_3$— is freed from cations by action of a closely cross-linked cation-exchanger in the H-cycle, the solution obtained then being neutralized preferably by the action of a mild basic anion-exchanger in the OH-cycle, whereupon the pure bacitracin is isolated from the solution, e.g. by extraction with a water-insoluble solvent, such as butanol, and evaporation of the extract.

The compounds used for the conversion of bacitracin into insoluble compounds of the general Formula I in essence are currently available wetting agents of the type of arylalkylsulfonates or alkyl sulfates, respectively. Even compounds wherein the group R has at least 4 carbon atoms can be used, yet with a higher number of carbon atoms the solubility of the complex compound in the given medium is reduced.

Of the complex-forming metals all metals forming complexes may be used that are practical from the technical point of view, such as zinc, cobalt, copper, manganese, nickel, etc. The process may be used for production either for drug purposes, or of pure bacitracin, or lastly of additives for animal feed. For the latter purpose the crude fermented medium including the biomass can be processed.

The precipitation of bacitracin from acid aqueous solution, even a very dilute one, is highly selective. The complex formed is very stable and only very little soluble in an acid medium. It has, however, good solubility in the more common alcohols at a pH from 4 to 9, where it already starts to decompose, which can be turned to advantage for the further processing into the desired form of bacitracin. The anion R—SO$_3$ can be removed in a mildy alkaline reaction by means of a weakly basic porous anion exchange resin from an aqueous or alcoholic medium, or from an aqueous medium by precipitating with an equivalent of the cation-active wetting agent. The precipitate formed can be extracted with non-polar solvents. The aqueous bacitracin solution, freed from the complex-forming component can be demineralized by passing over a closely cross-linked sulfonated cation-exchanger, whereupon the acid solution after decolorizing with charcoal is neutralized with a weakly basic anion-exchanger. The complex-forming metal can also be first removed, and the R—SO$_3$— component can thereupon be extracted in an acid reaction. The bacitracin solutions obtained can be directly lyophilized, or a bacitracin purification by extraction e.g. with butanol can be added. After removal of the anion R—SO$_3$, the insoluble salts can also be precipitated from the bacitracin solutions, such as zinc-bacitracin, manganese-bacitracin, and the like.

As desired, the eliminated complex bacitracin compound can be filtered off with the help of a filter-aid, and the filtered product can then be evaporated in vacuum. In this form it can be used for production of feed additives, eventually upon addition of other substances.

The method of isolation of bacitracin according to the invention in comparison with existing methods leads to significant economies in the industrial production of bacitracin but is subject to a number of possible variations within the scope of the claims.

Example 1

1300 ml. of a crude acidic solution of bacitracin, e.g. fermented nutrient medium as, freed from the biomass after previous acidification with snulfuric acid to a pH of 2.3 are filtered upon addition of kieselgur. To this solution containing 122 u/ml. of bacitracin, 1.5 g. zinc sulfate in the form of a saturated solution and 50 ml. of a 10%-aqueous solution of sodium diisobutylnaphthalene sulfonate are added. After elimination of the precipitate 10 g. kieselgur is added, the mixture is filtered, and the filter cake washed with water several times. After thorough separation by suction the product obtained is vacuum-dried at 50° C. There is obtained a total of 16 g. of the complex bacitracin compound with a biological activity of 9 units/mg. The yield is 91% relative to the total amount of active substance in the crude starting solution.

Example 2

To 1300 ml. bacitracin solution adjusted according to Example 1, 1.5 g. manganese (II) sulfate in the form of a saturated solution, and 50 ml. of a 10%-suspension of a mixture of sodium cetyl sulfonate and sodium oleyl sulfonate are added. After elimination of the precipitate 10 g. kieselgur is added, and the mixture is further processed in the same manner as in Example 1. The yield of the complex compound is 13.8 g. i.e. 87% relative to the total content of bacitracin in the starting solution. The activity is 10 units/mg.

Example 3

To 1300 ml bacitracin solution adjusted according to Example 1, 1.5 g. cobalt (II) sulfate in the form of a saturated solution, and 50 ml. of a 10%-solution of sodium salts of the sulfonated mixture of alcohols C$_8$–C$_{16}$ are added. After separation and addition of 10 g. kieselgur, the precipitate is processed as in Example 1. The yield of the complex compound is 17.7 g, i.e. 89.3% relative to the bacitracin content in the starting solution. The activity is 8 units/mg.

Example 4

To 1300 ml. bacitracin solution adjusted according to Example 1, 1.5 g. zinc sulfate in the form of a saturated solution, and 50 ml. of 10%-aqueous solution of the sodium salt of technically dodecylbenzenesulfonic acid are added. After separation and addition of 10 g. kieselgur, the mixture is processed in the same manner as in Example 1. The yield of the complex compound is 16.2 g., i.e. 90% relative to the content of bacitracin in the starting solution. The activity is 9 units/mg.

A freshly filtered precipitate of the complex bacitracin compound obtained according to Example 1, is dissolved in the exact quantity of methanol. The solution is divided into two equal parts. The first portion after being adjusted to a pH of 7.5 is slowly passed through a column of a strongly basic anion-exchanger (Zerolit FF) containing the active CH$_3$COO group. The effluent active component freed from the anion is concentrated to the minimum volume, and on acidification is filtered with active charcoal. After neutralizing, zinc sulfate is added to the filtrate, and the precipitate is separated by centrifuging. The remaining suspension is dried by lyophilization. There is obtained 1.0 zinc-bacitracin with biological activity 55 units/mg. The yield is 69.3%.

The other portion of the methanolic solution is passed through a column of a closely cross-linked sulfonate cation exchanger in the H-form, and then neutralized by passing over a weakly basic anion-exchanger in the OH-form. The effluent is extracted 4× with butanol in the ratio of 2:1. The butanol extract, ofter adding a small amount of water, is concentrated in vacuum, and the concentrate lyophilized. The yield is 0.55 g. of pure bacitracin, with activity 87 units/mg.

We claim:

1. The bacitracin complex compound obtained by adding to a crude culture solution of bacitracin
   (I) a member selected from the group consisting of:
   (a) a compound of the general formula R—SO$_3$H, R being a radical selected from the group consisting of alkyl, aralkyl and alkaryl; alkyl and aralkyl having from 4 to 20 carbon atoms and alkaryl having at least one alkyl substituent with from 4 to 16 carbon atoms attached to the nucleus and the aryl portion of these groups being phenyl or naphthyl and R being attached directly to the —SO$_3$H group;
   (b) a compound as defined in (a), wherein R is attached to the —SO$_3$H group through oxygen;
   (c) a soluble salt of the compounds defined at (a); and
   (d) a soluble salt of the compounds defined at (b); together with
   (II) a soluble salt of a complex-forming metal selected from the group consisting of zinc, cobalt, manganese, nickel and copper, the reaction being carried out in an acid solution at a pH between 2 and 5; then separating the thus formed complex compound, dissolving it in an alkanol having 1 to 5 carbon atoms, at a pH between 4 and 9; and precipitating the bacitracin complex compound from the solution by filtering and drying.

2. A method of recovering bacitracin from a crude solution thereof, the said method comprising the steps of adding to the solution
   (I) a member selected from the group consisting of:
   (a) a compound of the general formula R—SO$_3$H, R being a radical selected from the group consisting of alkyl, aralkyl and alkaryl; alkyl and aralkyl having from 4 to 20 carbon atoms and alkaryl having at least one alkyl substituent with from 4 to 16 carbon atoms attached to the nucleus, and the aryl portion of these groups being phenyl or naphthyl and R being attached directly to the —SO₃H group;
(b) a compound as defined in (a), wherein R is attached to the —SO₃H group through oxygen;
(c) a soluble salt of the compounds defined at (a); and
(d) a soluble salt of the compounds defined at (b); together with (II) a soluble salt of a complex-forming metal selected from the group consisting of zinc, cobalt, manganese, nickel and copper, the reaction being carried out in an acid solution; then separating the thus formed complex compound, dissolving it in an alkanol having 1 to 5 carbon atoms, at a pH between 4 and 9, then passing the solution through an anion-exchange compound and precipitating, neutralizing and isolating the bacitracin.

3. The method of claim 2, wherein the reaction with the R—SO₃H group and the complex metal salt is carried out at a pH between 2 and 5.

4. The method of claim 2, wherein the soluble salt of the R—SO₃H compound is the sodium salt.

5. The method of claim 2, wherein the effective group of the anion exchange resin is a CH₃COO— group.

6. The method of claim 2, wherein the product of the ion-exchange reaction is separated by precipitation with a soluble metal salt of the same type as has been employed in forming the complex compound; followed by separation of the precipitated bacitracin by centrifuging or filtering.

7. The method of claim 2, wherein the complex ion is removed from the said solution by reaction with a highly cross-linked cation-exchange resin in the H cycle, whereupon the solution obtained is neutralized by reaction with a weakly basic anion-exchange resin in the OH cycle, followed by extracting the bacitracin with a solvent and concentration of the residue by evaporation.

8. The method of claim 2, wherein the R—SO₃H component is diisobutylnaphthalenesulfonic acid.

9. The method of claim 2, wherein the R—SO₃H component is a sulfonated mixture of cetyl and oleyl alcohol.

10. The method of claim 2, wherein the R—SO₃H component is a mixture of sulfonated alcohols having from 8 to 16 carbon atoms.

11. The method of claim 2, wherein the R—SO₃H component is dodecylbenzenesulfonic acid.

References Cited
UNITED STATES PATENTS

| | | | |
|---|---|---|---|
| 2,498,165 | 2/1950 | Johnson et al. | 195—96 |
| 2,779,705 | 1/1957 | Peterson et al. | 167—65 |
| 2,834,711 | 5/1958 | Zinn et al. | 167—65 |
| 2,903,257 | 9/1959 | Zorn | 99—2 |

LEWIS GOTTS, *Primary Examiner.*

M. M. KASSENOFF, *Assistant Examiner.*